US009602442B2

(12) United States Patent
Han

(10) Patent No.: US 9,602,442 B2
(45) Date of Patent: *Mar. 21, 2017

(54) ALLOCATING BUFFER FOR TCP PROXY SESSION BASED ON DYNAMIC NETWORK CONDITIONS

(71) Applicant: A10 Networks, Inc., San Jose, CA (US)

(72) Inventor: Liang Han, Pleasanton, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,083

(22) Filed: Sep. 23, 2015

(65) Prior Publication Data

US 2016/0014052 A1 Jan. 14, 2016

Related U.S. Application Data

(63) Continuation of application No. 14/573,704, filed on Dec. 17, 2014, now Pat. No. 9,154,584, which is a
(Continued)

(51) Int. Cl.
*G06F 15/16* (2006.01)
*H04L 12/861* (2013.01)
(Continued)

(52) U.S. Cl.
CPC .......... *H04L 49/9005* (2013.01); *H04L 49/90* (2013.01); *H04L 67/28* (2013.01); *H04L 67/42* (2013.01); *H04L 69/16* (2013.01)

(58) Field of Classification Search
USPC ........ 709/201, 223, 226, 228; 370/230, 236; 1/1
See application file for complete search history.

(56) References Cited

U.S. PATENT DOCUMENTS

| 5,218,602 A | 6/1993 | Grant et al. |
|---|---|---|
| 5,774,660 A | 6/1998 | Brendel et al. |

(Continued)

FOREIGN PATENT DOCUMENTS

| CN | 1372662 A | 10/2002 |
|---|---|---|
| CN | 1449618 A | 10/2003 |

(Continued)

OTHER PUBLICATIONS

Cardellini et al., "Dynamic Load Balancing on Web-server Systems", IEEE Internet Computing, vol. 3, No. 3, pp. 28-39, May-Jun. 1999.
(Continued)

*Primary Examiner* — Quang N Nguyen
(74) *Attorney, Agent, or Firm* — Carr & Ferrell LLP

(57) ABSTRACT

Allocation of buffers for a TCP proxy session between a client and a server by a service gateway includes monitoring dynamic network behaviors for server and client side sessions of the TCP proxy session; and allocating capacity for a server side buffer and capacity for a client side buffer in a memory buffer based on the dynamic server side network behaviors, the dynamic client side network behaviors, and a weighted average of a capacity of the memory buffer. In one approach to the allocation, the gateway determines whether an available capacity of the server or client side buffer is sufficient to store a data packet. If not sufficient, the allocated capacity of the server or client side buffer is increased based on measurements of the dynamic network behaviors and the weighted average, and the available capacity of the server or client side buffer is adjusted accordingly.

18 Claims, 11 Drawing Sheets

Related U.S. Application Data continuation of application No. 14/293,641, filed on Jun. 2, 2014, now Pat. No. 8,977,749, which is a continuation of application No. 13/541,792, filed on Jul. 5, 2012, now Pat. No. 8,782,221.

(51) Int. Cl.
*H04L 29/08* (2006.01)
*H04L 29/06* (2006.01)

(56) References Cited

U.S. PATENT DOCUMENTS

| | | |
|---|---|---|
| 5,862,339 A | 1/1999 | Bonnaure et al. |
| 5,875,185 A | 2/1999 | Wang et al. |
| 5,935,207 A | 8/1999 | Logue et al. |
| 5,958,053 A | 9/1999 | Denker |
| 6,003,069 A * | 12/1999 | Cavill .................. G06F 3/1203 709/201 |
| 6,047,268 A | 4/2000 | Bartoli et al. |
| 6,075,783 A | 6/2000 | Voit |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,456,617 B1 | 9/2002 | Oda et al. |
| 6,459,682 B1 | 10/2002 | Ellesson et al. |
| 6,483,600 B1 | 11/2002 | Schuster et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,748,414 B1 | 6/2004 | Bournas |
| 6,772,205 B1 | 8/2004 | Lavian et al. |
| 6,772,334 B1 | 8/2004 | Glawitsch |
| 6,779,033 B1 | 8/2004 | Watson et al. |
| 6,804,224 B1 | 10/2004 | Schuster et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,733,866 B2 | 6/2010 | Mishra et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 * | 6/2011 | Sakata .................. H04H 20/82 370/236 |
| 7,970,934 B1 | 6/2011 | Patel |
| 7,979,694 B2 | 7/2011 | Touitou et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 7,992,201 B2 | 8/2011 | Aldridge et al. |
| 8,019,870 B1 | 9/2011 | Eppstein et al. |
| 8,032,634 B1 | 10/2011 | Eppstein et al. |
| 8,081,640 B2 | 12/2011 | Ozawa et al. |
| 8,090,866 B1 | 1/2012 | Bashyam et al. |
| 8,099,492 B2 * | 1/2012 | Dahlin .................. H04L 29/06 709/223 |
| 8,116,312 B2 | 2/2012 | Riddoch et al. |
| 8,122,116 B2 * | 2/2012 | Matsunaga ........... G06F 3/0626 709/226 |
| 8,151,019 B1 | 4/2012 | Le et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,261,339 B2 | 9/2012 | Aldridge et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,559,437 B2 | 10/2013 | Mishra et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,386,088 B2 | 7/2016 | Zheng et al. |
| 9,531,846 B2 | 12/2016 | Han et al. |
| 2001/0042200 A1 | 11/2001 | Lamberton et al. |
| 2001/0049741 A1 | 12/2001 | Skene et al. |
| 2002/0026515 A1 | 2/2002 | Michielsens et al. |

(56) References Cited

U.S. PATENT DOCUMENTS

| | | |
|---|---|---|
| 2002/0032777 A1 | 3/2002 | Kawata et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141386 A1 | 10/2002 | Minert et al. |
| 2002/0143991 A1 | 10/2002 | Chow et al. |
| 2002/0178259 A1 | 11/2002 | Doyle et al. |
| 2002/0188678 A1 | 12/2002 | Edecker et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0061506 A1 | 3/2003 | Cooper et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0010545 A1 | 1/2004 | Pandya |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0111516 A1 | 6/2004 | Cain |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0250059 A1 | 12/2004 | Ramelson et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0039033 A1 | 2/2005 | Meyers et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0281190 A1 | 12/2005 | McGee et al. |
| 2006/0023721 A1 | 2/2006 | Miyake et al. |
| 2006/0036610 A1* | 2/2006 | Wang ............... G06F 17/30905 |
| 2006/0036733 A1 | 2/2006 | Fujimoto et al. |
| 2006/0041745 A1 | 2/2006 | Parnes |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0164978 A1 | 7/2006 | Werner et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0124502 A1 | 5/2007 | Li |
| 2007/0156919 A1 | 7/2007 | Potti et al. |
| 2007/0165622 A1 | 7/2007 | O'Rourke et al. |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0120129 A1 | 5/2008 | Seubert et al. |
| 2008/0134332 A1 | 6/2008 | Keohane et al. |
| 2008/0162679 A1 | 7/2008 | Maher et al. |
| 2008/0225722 A1 | 9/2008 | Khemani et al. |
| 2008/0228781 A1 | 9/2008 | Chen et al. |
| 2008/0250099 A1 | 10/2008 | Shen et al. |
| 2008/0253390 A1 | 10/2008 | Das et al. |
| 2008/0271130 A1 | 10/2008 | Ramamoorthy |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0285196 A1 | 11/2009 | Lee et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0095018 A1 | 4/2010 | Khemani et al. |
| 2010/0106833 A1 | 4/2010 | Banerjee et al. |
| 2010/0106854 A1 | 4/2010 | Kim et al. |
| 2010/0162378 A1 | 6/2010 | Jayawardena et al. |
| 2010/0205310 A1* | 8/2010 | Altshuler ............... H04L 47/10 709/228 |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |

(56) References Cited

U.S. PATENT DOCUMENTS

| | | |
|---|---|---|
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099623 A1 | 4/2011 | Garrard et al. |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1* | 1/2012 | Shen ............... H04L 47/30 370/230 |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0215910 A1 | 8/2012 | Wada |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0039671 A1 | 2/2015 | Jalan et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |

FOREIGN PATENT DOCUMENTS

| | | |
|---|---|---|
| CN | 1473300 A | 2/2004 |
| CN | 1529460 A | 9/2004 |
| CN | 1575582 A | 2/2005 |
| CN | 1714545 A | 12/2005 |
| CN | 1725702 A | 1/2006 |
| CN | 1910869 A | 2/2007 |
| CN | 101004740 A | 7/2007 |
| CN | 101094225 A | 12/2007 |
| CN | 101163336 A | 4/2008 |
| CN | 101169785 A | 4/2008 |
| CN | 101189598 A | 5/2008 |
| CN | 101247349 A | 8/2008 |
| CN | 101261644 A | 9/2008 |
| CN | 101442425 A | 5/2009 |
| CN | 101682532 A | 3/2010 |
| CN | 102123156 A | 7/2011 |
| CN | 102546590 A | 7/2012 |
| CN | 102571742 A | 7/2012 |
| CN | 102577252 A | 7/2012 |
| CN | 102918801 A | 2/2013 |
| CN | 103533018 A | 1/2014 |
| CN | 103944954 A | 7/2014 |
| CN | 104040990 A | 9/2014 |
| CN | 104067569 A | 9/2014 |
| CN | 104106241 A | 10/2014 |
| CN | 104137491 A | 11/2014 |
| CN | 104796396 A | 7/2015 |
| CN | 102577252 B | 3/2016 |
| EP | 1209876 A2 | 5/2002 |
| EP | 1770915 A1 | 4/2007 |
| EP | 1885096 A1 | 2/2008 |
| EP | 02296313 | 3/2011 |
| EP | 2577910 A2 | 4/2013 |
| EP | 2622795 A2 | 8/2013 |
| EP | 2647174 A2 | 10/2013 |
| EP | 2760170 A1 | 7/2014 |
| EP | 2772026 A1 | 9/2014 |
| EP | 2901308 A2 | 8/2015 |
| HK | 1182560 | 11/2013 |
| HK | 1183569 | 12/2013 |
| HK | 1183996 | 1/2014 |
| HK | 1189438 | 6/2014 |
| HK | 1198565 A1 | 5/2015 |

(56) References Cited

FOREIGN PATENT DOCUMENTS

| | | |
|---|---|---|
| HK | 1198848 A1 | 6/2015 |
| HK | 1199153 A1 | 6/2015 |
| HK | 1199779 A1 | 7/2015 |
| HK | 1200617 A | 8/2015 |
| IN | 261CHE2014 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2003141068 A | 5/2003 |
| JP | 2005141441 A | 6/2005 |
| JP | 2006332825 A | 12/2006 |
| JP | 2008040718 A | 2/2008 |
| JP | 2013528330 A | 7/2013 |
| JP | 2014143686 A | 8/2014 |
| JP | 2015507380 A | 3/2015 |
| JP | 5855663 B2 | 12/2015 |
| JP | 5906263 B2 | 4/2016 |
| KR | 100830413 B1 | 5/2008 |
| KR | 20130096624 A | 8/2013 |
| KR | 101576585 B1 | 12/2015 |
| TW | 269763 B | 2/1996 |
| TW | 425821 B | 3/2001 |
| TW | 444478 B | 7/2001 |
| WO | WO0113228 | 2/2001 |
| WO | WO0114990 | 3/2001 |
| WO | WO0145349 | 6/2001 |
| WO | WO03103237 | 12/2003 |
| WO | WO2004084085 A1 | 9/2004 |
| WO | WO2006098033 A1 | 9/2006 |
| WO | WO2008053954 A1 | 5/2008 |
| WO | WO2008078593 A1 | 7/2008 |
| WO | WO2011049770 A2 | 4/2011 |
| WO | WO2011079381 A1 | 7/2011 |
| WO | WO2011149796 A2 | 12/2011 |
| WO | WO2012050747 A2 | 4/2012 |
| WO | WO2012075237 A2 | 6/2012 |
| WO | WO2013070391 A1 | 5/2013 |
| WO | WO2013081952 A1 | 6/2013 |
| WO | WO2013096019 A1 | 6/2013 |
| WO | WO2013112492 A1 | 8/2013 |
| WO | WO2014031046 A1 | 2/2014 |
| WO | WO2014052099 A2 | 4/2014 |
| WO | WO2014088741 A1 | 6/2014 |
| WO | WO2014093829 A1 | 6/2014 |
| WO | WO2014138483 A1 | 9/2014 |
| WO | WO2014144837 A1 | 9/2014 |
| WO | WO2014179753 A2 | 11/2014 |
| WO | WO2015153020 A1 | 10/2015 |
| WO | WO2015164026 A1 | 10/2015 |

OTHER PUBLICATIONS

Spatscheck et al., "Optimizing TCP Forwarder Performance", IEEE/ACM Transactions on Networking, vol. 8, No. 2, Apr. 2000.
Kjaer et al. "Resource allocation and disturbance rejection in web servers using SLAs and virtualized servers", IEEE Transactions on Network and Service Management, IEEE, US, vol. 6, No. 4, Dec. 1, 2009.
Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.
Goldszmidt et al. NetDispatcher: A TCP Connection Router, IBM Research Report RC 20853, May 19, 1997.
Koike et al., "Transport Middleware for Network-Based Control," IEICE Technical Report, Jun. 22, 2000, vol. 100, No. 53, pp. 13-18.
Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.
Abe et al., "Adaptive Split Connection Schemes in Advanced Relay Nodes," IEICE Technical Report, Feb. 22, 2010, vol. 109, No. 438, pp. 25-30.
Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.
"Tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.
In Journal 39/2015, Sep. 25, 2015, Jalan et al., In Cumulative version of WO2013070391.
"Enhanced Interior Gateway Routing Protocol", Cisco, Document ID 16406, Sep. 9, 2005 update, 43 pages.
Crotti, Manuel et al., "Detecting HTTP Tunnels with Statistical Mechanisms", IEEE International Conference on Communications, Jun. 24-28, 2007, pp. 6162-6168.
Haruyama, Takahiro et al., "Dial-to-Connect VPN System for Remote DLNA Communication", IEEE Consumer communications and Networking Conference, CCNC 2008. 5th IEEE, Jan. 10-12, 2008, pp. 1224-1225.
Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.
"EIGRP MPLS VPN PE-CE Site of Origin (SoO)", Cisco Systems, Feb. 28, 2006, 14 pages.

* cited by examiner

ALLOCATING BUFFER FOR TCP PROXY SESSION BASED ON DYNAMIC NETWORK CONDITIONS

CROSS-REFERENCE TO RELATED APPLICATIONS

This application is a continuation and claims the priority benefit of U.S. patent application Ser. No. 14/573,704 filed on Dec. 17, 2014, now U.S. Pat. No. 9,154,584 issued on Oct. 6, 2015 and entitled "Allocating Buffer for TCP Proxy Session Based on Dynamic Network Conditions", which in turn is a continuation of and claims the priority benefit of U.S. patent application Ser. No. 14/293,641 filed on Jun. 2, 2014, now U.S. Pat. No. 8,977,749 issued on Mar. 10, 2015 and entitled "Allocating Buffer for TCP Proxy Session Based on Dynamic Network Conditions", which in turn is a continuation of and claims the priority benefit of U.S. patent application Ser. No. 13/541,792 filed on Jul. 5, 2012, now U.S. Pat. No. 8,782,221 issued on Jul. 15, 2014 and entitled "Method to Allocate Buffer for TCP Proxy Session Based on Dynamic Network Conditions". The disclosures of each of the above-referenced applications are incorporated herein by reference in their entirety for all purposes.

BACKGROUND OF THE INVENTION

Field

This invention relates generally to data communications, and more specifically, to a service gateway.

Background

Many service gateways such as firewalls and server load balancers provide Transmission Control Protocol (TCP) proxy functionality for some time. Typical uses of TCP proxy include network analysis, security, and traffic adaptation due to asymmetric client and server condition. A TCP proxy server typically allocates a fix amount of memory buffer to handle the data packet buffering of a TCP proxy session between a client device and a server. The memory buffer is used to handle data packet buffers for client side session and server side session. The allocation of memory space among the client side session send and receive buffers, and server side session send and receive buffers does not often take performance into consideration. Common allocation methods include equally dividing the memory buffer among the session send and receive buffers, or a fix weighted average between the send and receive buffers, such as two to one ratio between server side receive buffer and client side send buffer.

Although TCP proxy is known for some time, it has not been used in any significant way. The correlation between the buffer allocation method and the performance of the TCP proxy session is not well understood. Today, many service gateway applications such as HTTP proxy, content filtering applications, advanced server load balancing methods, are deployed widely. Performance of these applications is in part depending on the performance of the TCP proxy session buffer allocation method.

Due to the different and dynamic network characteristics of client devices and servers, a pre-determined allocation of buffer spaces does not perform well on different network conditions. Therefore there is a need to allocate buffer spaces for a TCP proxy session based on one or more dynamic network conditions.

BRIEF SUMMARY OF THE INVENTION

According to one embodiment of the present invention, a method for allocating buffers for a TCP proxy session between a client and a server by a service gateway comprising a processor, comprises: monitoring, by the processor, dynamic server side network behaviors for a server side session of the TCP proxy session and dynamic client side network behaviors for a client side session of the TCP proxy session; and allocating, by the processor, capacity for a server side buffer and capacity for a client side buffer in a memory buffer based on the dynamic server side network behaviors, the dynamic client side network behaviors, and a weighted average of a capacity of the memory buffer.

In one aspect of the present invention, the allocating comprises: calculating a maximum capacity for the server side buffer and a maximum capacity for the client side buffer based on the dynamic server side network behaviors, the dynamic client side network behaviors, and the weighted average of the capacity of the memory buffer; and allocating the capacity for the server side buffer and the capacity for the client side buffer based on the maximum capacity for the server side buffer and the maximum capacity for the client side buffer.

In one aspect of the present invention, the allocating comprises: receiving a server side session data from the server, or receiving a client side session data packet from the client; determining whether an available capacity of the server side buffer is sufficient to store the server side session data packet, or determining whether an available capacity of the client side buffer is sufficient to store the client side session data packet; in response to determining that the available capacity of the server side buffer is not sufficient to store the server side session data packet, increasing the allocated capacity of the server side buffer, or in response to determining that the available capacity of the client side buffer is not sufficient to store the client side session data packet, increasing the allocated capacity of the client side buffer; and adjusting the available capacity of the server side buffer according to the increase of the allocated capacity of the server side buffer, or adjusting the available capacity of the client side buffer according to the increase of the allocated capacity of the client side buffer.

In one aspect of the present invention, the increasing comprises: in response to determining that the available capacity of the server side buffer is not sufficient to store the server side session data packet, determining whether the allocated capacity of the server side buffer is smaller than a maximum capacity of the server side buffer, or in response to determining that the available capacity of the client side buffer is not sufficient to store the client side session data packet, determining whether the allocated capacity of the client side buffer is smaller than a maximum capacity of the client side buffer; and in response to determining that the allocated capacity of the server side buffer is smaller than the maximum capacity of the server side buffer, determining whether there is sufficient memory space within the maximum capacity of the server side buffer to store the server side session data packet, or in response to determining that the allocated capacity of the client side buffer is smaller than the maximum capacity of the client side buffer, determining whether there is sufficient memory space within the maximum capacity of the client side buffer to store the client side session data packet; in response to determining that there is sufficient memory space within the maximum capacity of the server side buffer to store the server side session data packet, allocating the memory space to the server side buffer and adjusting the available capacity of the server side buffer according to the allocated memory space, or in response to determining that there is sufficient memory space within the maximum capacity of the client side buffer to store the client side session data packet, allocating the memory space to the client side buffer and adjusting the available capacity of the client side buffer according to the allocated memory space.

In one aspect of the present invention, the monitoring and the calculating comprises: measuring a server side data packet round trip time (RTT) and a client side data packet RTT; and calculating the maximum capacity for the server side buffer and the maximum capacity for the client side buffer using the server side data packet RTT, the client side RTT, and the weighted average of the capacity of the memory buffer.

In one aspect of the present invention, the weighted average of the capacity of the memory buffer is biased toward the server in calculating the maximum capacity for the server side buffer, or wherein the weighted average of the capacity of the memory buffer is biased toward the client in calculating the maximum capacity for the client side buffer.

In one aspect of the present invention, the monitoring further comprises: obtaining new measurements for the server side data packet RTT and the client side data packet RTT; and modifying the maximum capacity for the server side buffer and the maximum capacity for the client side buffer using the new server side data packet RTT, the new client side data packet RTT, and the weighted average of the capacity of the memory buffer.

In one aspect of the present invention, the measuring and the calculating comprises: measuring the server side data packet RTT, the client side data packet RTT, a server side transmission rate, and a client side transmission rate; and calculating the maximum capacity for the server side buffer and the maximum capacity for the client side buffer using the server side data packet RTT, the client side RTT, the server side transmission rate, the client side transmission rate, and the weighted average of the capacity of the memory buffer.

In one aspect of the present invention, the monitoring further comprises: obtaining new measurements for the server side transmission rate and the client side transmission rate; and modifying the maximum capacity for the server side buffer and the maximum capacity for the client side buffer using the server side data packet RTT, the client side data packet RTT, the new server side transmission rate, the new client side transmission rate, and the weighted average of the capacity of the memory buffer.

System and computer program products corresponding to the above-summarized methods are also described and claimed herein.

DETAILED DESCRIPTION OF THE INVENTION

Figure 1:
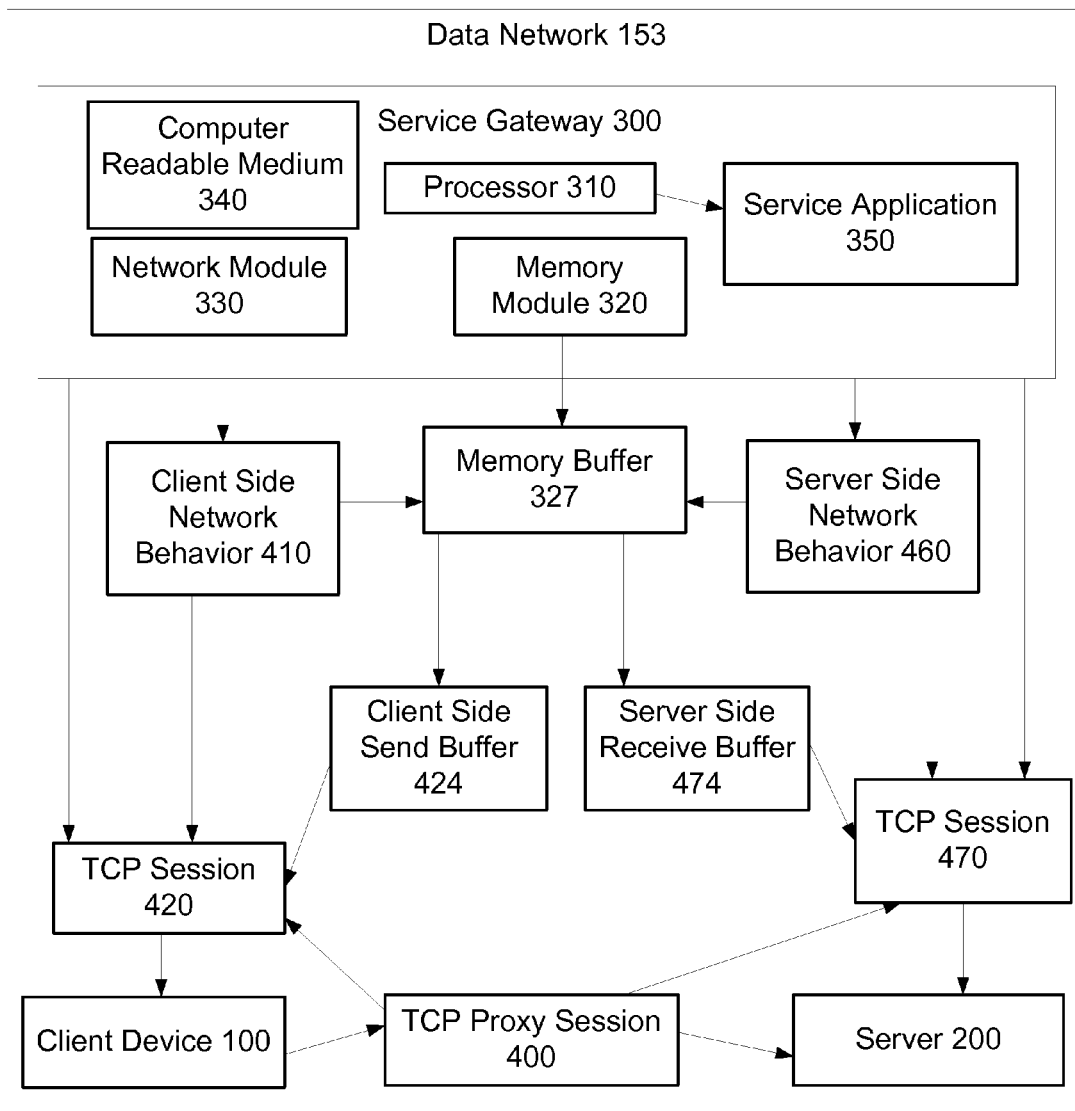
FIG. 1 illustrates an embodiment of a service gateway servicing a TCP proxy session between a client device and a server according to the present invention.

The present invention can take the form of an entirely hardware embodiment, an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a service gateway 300 servicing a TCP proxy session 400 between a client device 100 and a server 200 via a data network 153.

In one embodiment, data network 153 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 153 resides in a data center, or connects to a network or application network cloud.

Client device 100 is typically a computing device with network access capabilities. In one embodiment, client device 100 is a workstation, a desktop personal computer or a laptop personal computer, a Personal Data Assistant (PDA), a tablet computing device, a smartphone, or a cellular phone, a set-top box, an Internet media viewer, an Internet media player, a smart sensor, a smart medical device, a net-top box, a networked television set, a networked DVR, a networked Blu-ray player, a networked handheld gaming device, or a media center.

In one embodiment, client device 100 is a residential broadband gateway, a business Internet gateway, a business Web proxy server, a network customer premise device (CPE), or an Internet access gateway.

In one embodiment, client device 100 includes a broadband remote access server (BRAS), a Digital Subscriber Line Access Multiplexer (DSLAM), a Cable Modem Terminating System (CMTS), or a service provider access gateway.

In one embodiment, client device 100 includes a mobile broadband access gateway such as a Gateway GPRS Support Node (GGSN), a Home Agent (HA), or a PDN Gateway (PGW).

In one embodiment, client device 100 includes a server load balancer, an application delivery controller, a traffic manager, a firewall, a VPN server, a remote access server, or an enterprise or datacenter access gateway.

In one embodiment, client device 100 is a device that performs functions similar to service gateway 300.

Client device 100 initiates TCP session 400 towards server 200 via service gateway 300.

Server 200 is a computing device typically coupled to a processor and a computer readable medium which stores computer readable program code. Server 200, with the processor and the computer readable program code, implements functionality of a Web server, a file server, a video server, a database server, an application server, a voice system, a conferencing server, a media gateway, a media center, an app server or a network server providing a TCP-based service or an application service to client device 100 using the TCP session 400.

In one embodiment, server 200 is a device that performs functions similar to service gateway 300.

In one embodiment, TCP session 400 includes a HTTP session, a FTP file transfer session, a TCP-based video streaming session, a TCP-based music streaming session, a file download session, a group conferencing session, a database access session, a remote terminal access session, a Telnet session, an e-commerce transaction, a remote procedure call, or an TCP-based network communication sessions.

Service gateway 300 is operationally coupled to a processor 310, a memory module 320, a network module 330, and a computer readable medium 340. The computer readable medium 340 stores computer readable program code, which when executed by the processor 310 using the memory module 320, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway to distribute load to one or more servers, a Web or HTTP server, a network address translation (NAT) gateway, or a TCP proxy server.

In one embodiment of servicing TCP proxy session 400 between client device 100 and server 200, service gateway 300 establishes a client side TCP session 420 with client device 100, and a server side TCP session 470 with server 200.

In one embodiment, computer readable medium 340 includes instructions for a service application 350 and processor 310 executes service application 350.

In one embodiment, service application 350 implements functionality of a VPN firewall, a gateway security application, a HTTP proxy, a TCP-based audio or video streaming session proxy, a Web session proxy, content filtering, server load balancing, firewall, or a network application session proxy.

In one embodiment, service gateway 300 includes a memory buffer 327 for processing TCP proxy session 400. In one embodiment, memory buffer 327 capacity is predetermined, for example 1 MB, 400 KB, 200 KB or 2 MB. In an embodiment, service gateway 300 reserves a portion of memory module 320 as memory buffer 327 to process TCP proxy session 400.

In one embodiment, service gateway 300 allocates a client side send buffer 424 for client side TCP session 420 and a server side receive buffer 474 for server side TCP session 470, where client side send buffer 424 and server side receive buffer 474 reside in memory buffer 327.

In one embodiment, service gateway 300 monitors a dynamic server side network behavior 460 for server side session TCP 470 and a dynamic client side network behavior 410 for client side TCP session 420. Service gateway 300 allocates client side send buffer 424 and allocates server side receive buffer 474 based on dynamic client side network behavior 410 and dynamic server side network behavior 460.

Figure 2A:
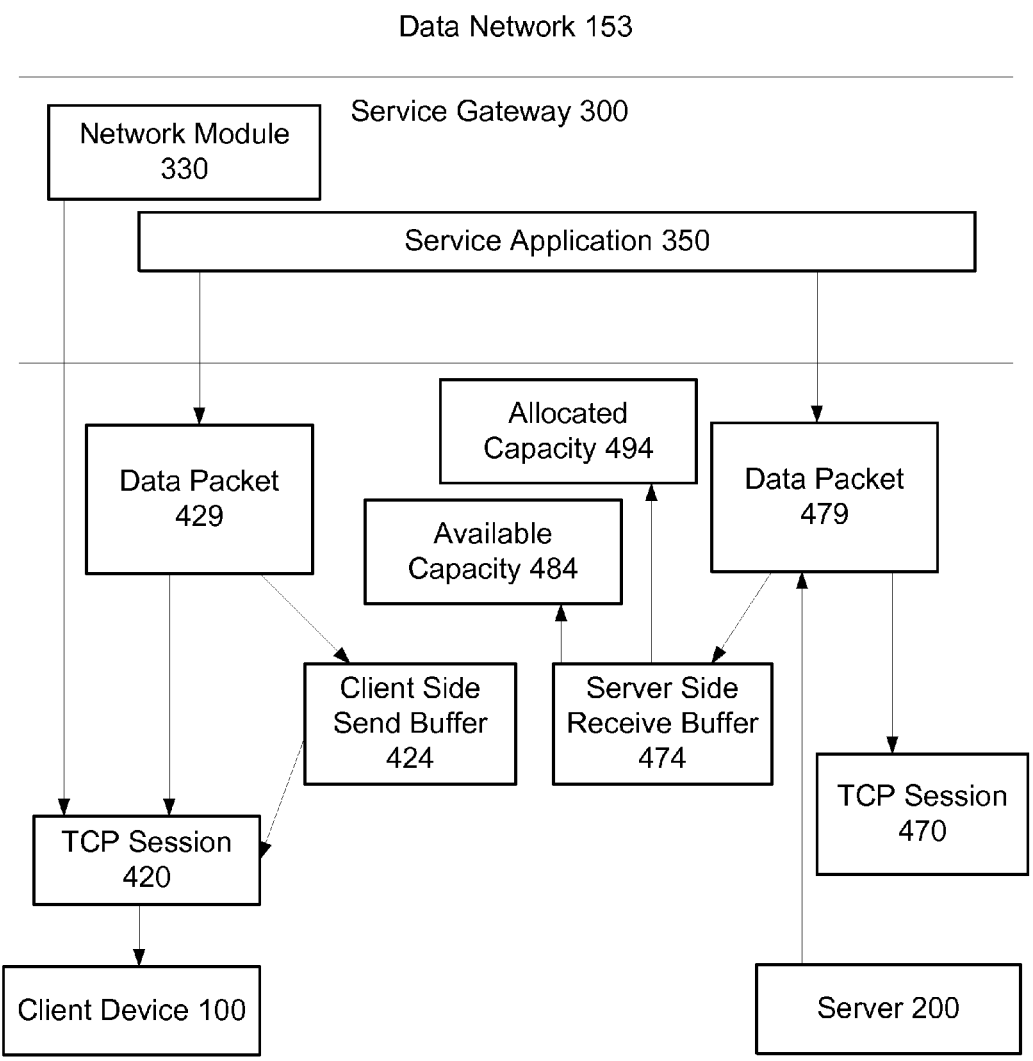
FIG. 2A illustrates an embodiment of a service gateway receiving a data packet from server according to the present invention.

In one embodiment as illustrated in FIG. 2A, service gateway 300 receives a data packet 479 of server side TCP session 470 from server 200. Service gateway 300 stores data packet 479 in server side receive buffer 474. Service application 350 retrieves data packet 479 from server side receive buffer 474 and processes data packet 479. In one embodiment, service application 350 creates a data packet 429 using data packet 479. Service application 350 sends data packet 429 to client device 100, by placing data packet 429 into client side send buffer 424. Service gateway 300 instructs network module 330 to transmit data packet 429 from client side send buffer 424 to client device 100.

In one embodiment, service gateway 300 determines that available capacity 484 of server side receive buffer 474 is sufficient to store data packet 479. Service gateway 300 stores data packet 479 into server side receive buffer 474 and reduces available capacity 484 by the amount of memory space necessary to store data packet 479.

In one embodiment, service gateway 300 determines available capacity 484 is not sufficient, service gateway 300 increases the allocated capacity 494 of server side receive buffer 474, and adjusts available capacity 484 according to the increase of allocated capacity 494. If the adjusted available capacity 484 is sufficient, service gateway 300 stores data packet 479 into server side receive buffer 474 and reduces available capacity 484 according to the memory space necessary to store data packet 479.

In one embodiment where service gateway 300 determines available capacity 484 is insufficient, even after adjustment, service gateway 300 discards data packet 479.

In one embodiment, service application 350 retrieves data packet 479 from server side receive buffer 474. Service gateway 300 removes data packet 479 from server side receive buffer 474 and increases available capacity 484 according to the memory space consumed by data packet 479.

Figure 2B:
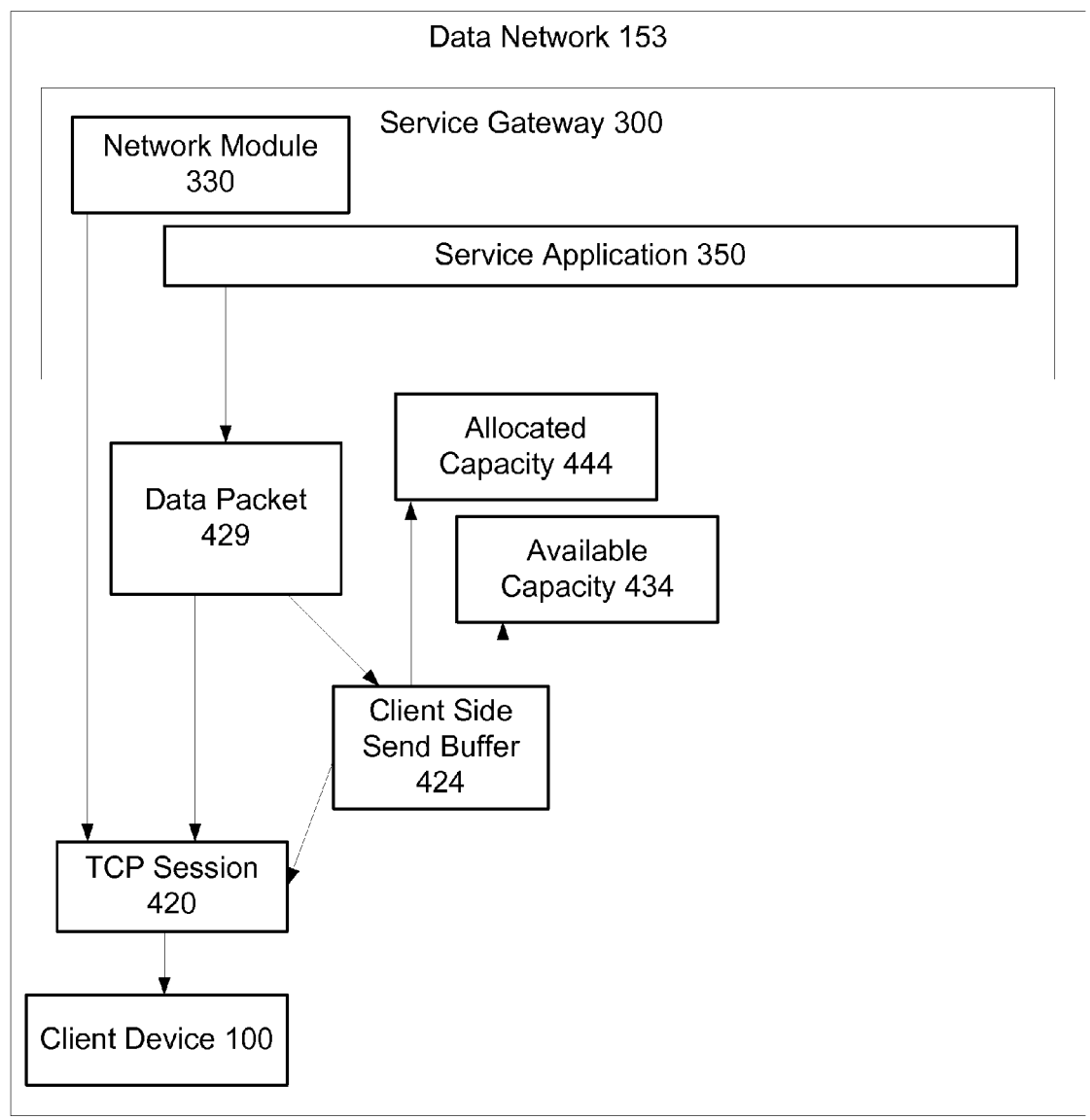
FIG. 2B illustrates an embodiment of a service gateway sending a data packet to client device according to the present invention.

In one embodiment as illustrated in FIG. 2B, before service gateway 300 stores data packet 429 into client side send buffer 424, service gateway 300 checks if an available capacity 434 of client side send buffer 424 is sufficient to store data packet 429. If the check is affirmative, service gateway 300 stores data packet 429 into client side send buffer 424 and reduces available capacity 434 according to the memory space necessary to store data packet 429.

In one embodiment, service gateway 300 determines available capacity 434 is not sufficient, service gateway 300 increases allocated capacity 444 of client side send buffer 424, and adjusts available capacity 434 according to the increase of allocated capacity 444. If the adjusted available capacity 434 is sufficient, service gateway 300 stores data packet 429 into client side send buffer 424 and reduces available capacity 434 according to the memory space necessary to store data packet 429.

In one embodiment where service gateway 300 determines available capacity 434 is insufficient, even after adjustment, service gateway 300 discards data packet 429. In one embodiment, service gateway 300 waits until available capacity 434 becomes sufficient after adjustment.

In one embodiment, network module 330 successfully transmits data packet 429 from client side send buffer 424. Service gateway 300 removes data packet 429 from client side send buffer 424 and increases available capacity 434 according to the memory space consumed by data packet 429.

Figure 3:
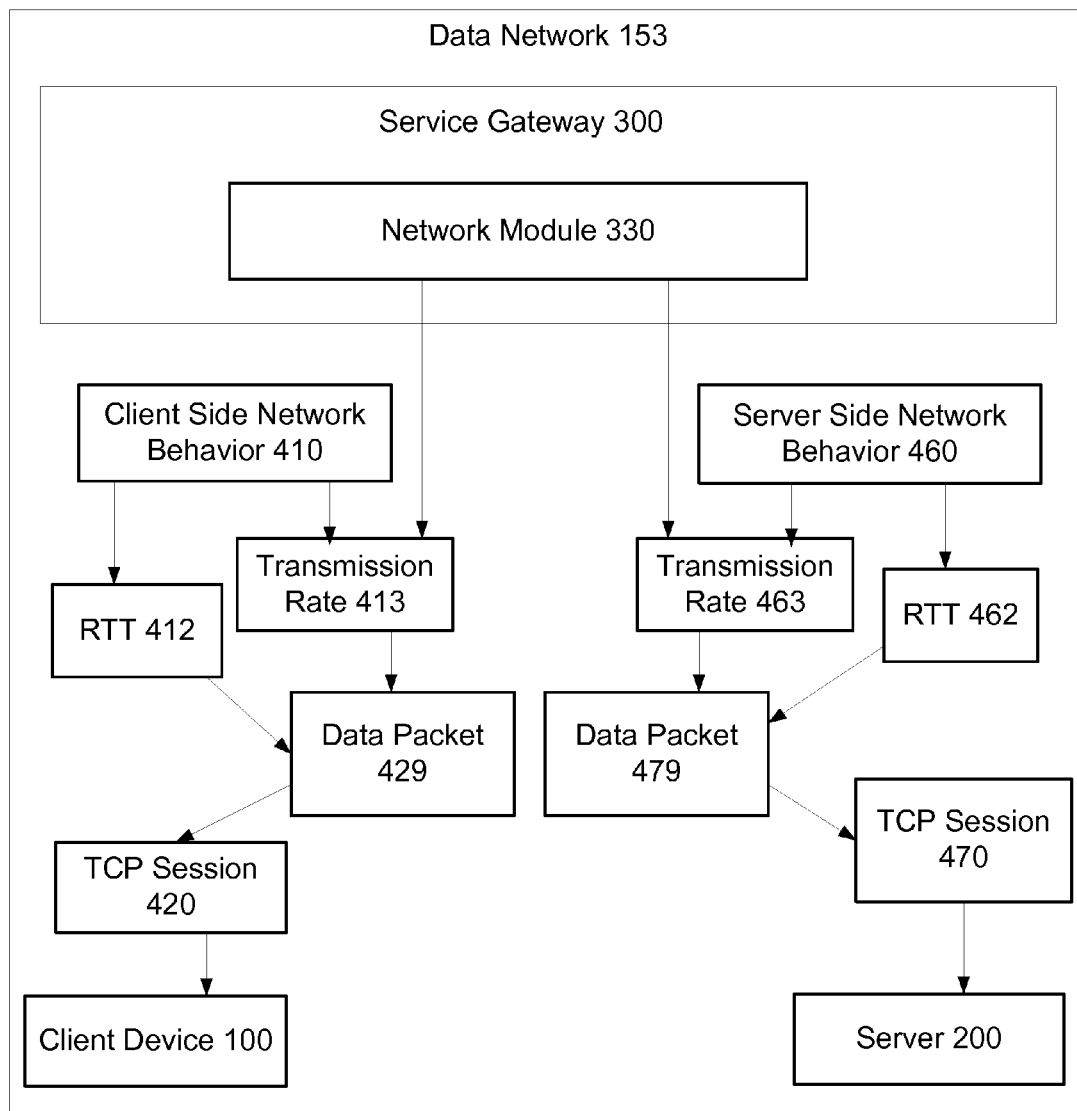
FIG. 3 illustrates an embodiment of a service gateway monitoring a server side network behavior and a client side network behavior according to the present invention.

In an embodiment illustrated in FIG. 3, service gateway 300 monitors dynamic server side network behavior 460 for server side session 470. In one embodiment, dynamic server side network behavior 460 includes a server side data packet round trip time (RTT) 462, a server side transmission rate 463, or a dynamic server side network attribute that affects service gateway 300 receiving data packet 479. In one embodiment, server side RTT 462 affects the time data packet 479 is transmitted through data network 153. In one embodiment, server side transmission rate 463 affects the rate of receiving data packet 479 by network module 330. In one embodiment, RTT 462 and transmission rate 463 are related.

Service gateway 300 measures or estimates server side RTT 462 for server side session 470. In one example embodiment, service gateway 300 measures server side RTT 462 based on a duration between a time service gateway 300 sending a data packet of server side session 470 to server 200 and a time service gateway 300 receiving an acknowledgement for the sent data packet. In one embodiment, service gateway 300 measures RTT 462 from time to time during server side TCP session 470. In one embodiment, service gateway 300 estimates server side RTT 462 based on one or more prior server side TCP sessions with server 200. In one embodiment, service gateway 300 estimates server side RTT 462 to be 10 milliseconds, 100 milliseconds, 3 milliseconds, 22 milliseconds, or 3 seconds.

In one embodiment, service gateway 300 calculates server side transmission rate 463 as a bandwidth of a network interface used by network module 330 to receive data packets of server side TCP session 470. In one embodiment, server side transmission rate 463 is the bandwidth of a virtual network interface. In one embodiment, service gateway 300 calculates server side transmission rate 463 by calculating one or more transmission rate of one or data packets of server side TCP session 470 over a period of time. In one embodiment, service gateway 300 calculates a new transmission rate 463 from time to time. In one embodiment, service gateway 300 calculates server side transmission rate 463 to be 1 Mbps, 43 Mbps, 100 Mbps, 1 Gbps, 600 Mbps, 25 Mbps or 10 Gbps.

In one embodiment, service gateway 300 monitors dynamic client side network behavior 410 of client side session 420. In one embodiment, dynamic client side network behavior 410 includes a client side data packet round trip time (RTT) 412, a client side transmission rate 413, or a dynamic network attribute that affects service gateway 300 sending data packet 429. In one embodiment, client side RTT 412 affects the time data packet 429 is transmitted through data network 153. In one embodiment, client side transmission rate 413 affects the rate of sending data packet 429 by network module 330. In one embodiment, RTT 412 and transmission rate 413 are related.

Service gateway 300 measures or estimates client side RTT 412. In one example embodiment, service gateway 300 measures client side RTT 412 based on a duration between a time service gateway 300 sends a data packet of client side session 420 to client device 100 and a time service gateway 300 receives an acknowledgment for the sent data packet. In one embodiment, service gateway 300 measures RTT 412 from time to time during client side TCP session 420. In one embodiment, service gateway 300 estimates client side RTT 412 based on one or more prior server side TCP sessions with client device 100. In one embodiment, service gateway 300 estimates server side RTT 462 to be 10 milliseconds, 100 milliseconds, 3 milliseconds, 22 milliseconds, or 3 seconds.

In one embodiment, service gateway 300 calculates client side transmission rate 413 as a bandwidth of a network interface used by network module 330 to transmit data packets of client side TCP session 420. In one embodiment, client side transmission rate 413 is the bandwidth of a virtual network interface. In one embodiment, service gateway 300 calculates client side transmission rate 413 by calculating one or more transmission rate of one or data packets of client side TCP session 420 over a period of time. In one embodiment, service gateway 300 calculates a new transmission rate 413 from time to time. In one embodiment, service gateway 300 calculates client side transmission rate 413 to be 1 Mbps, 43 Mbps, 100 Mbps, 1 Gbps, 600 Mbps, 25 Mbps or 10 Gbps.

Figure 4:
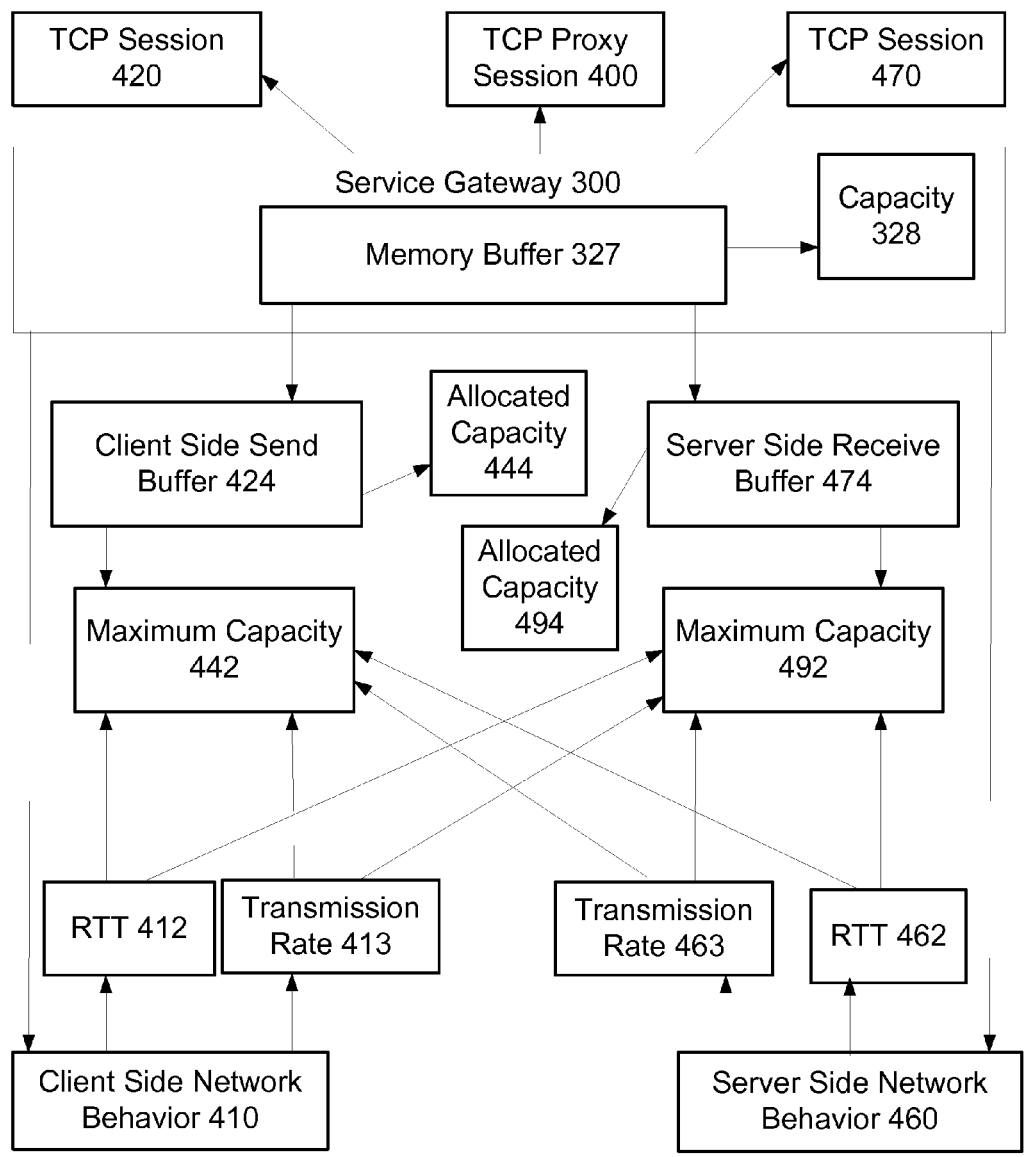
FIG. 4 illustrates an embodiment of a memory space allocation process for server side receive buffer and client side send buffer according to the present invention.

FIG. 4 illustrates an embodiment for service gateway 300 to allocate memory space from memory buffer 327 to server side receive buffer 474 and client side send buffer 424. In one embodiment, service gateway 300 reserves a portion of memory buffer 327 for server side receive buffer 474 and a portion for client side send buffer 424, when service gateway 300 starts processing TCP proxy session 400. In one embodiment, service gateway 300 starts processing TCP proxy session 400 when service gateway 300 establishes server side TCP session 470 and/or client side TCP session 420. In one embodiment, service gateway 300 allocates initially a pre-determined capacity 494 of server side receive buffer 474. For example allocated capacity 494 is initially pre-determined at 10% of memory buffer 327, 8%, ⅛, or another pre-determined fraction of memory buffer 327. In another embodiment, initially allocated capacity 494 is preset to be 30 KB, 32 KB, 4 KB, 64 KB or 100 KB. Similarly service gateway 300 pre-determines the initially allocated capacity 444 of client side send buffer 424. Service gateway 300 further sets available capacity 484 of server side receive buffer 474 to be the same as allocated capacity 494, and available capacity 434 of client side send buffer 424 to be the same as allocated capacity 444.

In one embodiment, service gateway 300 calculates the maximum capacity 492 for server side receive buffer 474 and maximum capacity 442 client side send buffer 424. In one embodiment, service gateway 300 calculates using RTT 462 and RTT 412 according to equation 1 and equation 2, using a weighted average of capacity 328 of memory buffer 327 based on RTT 462 and RTT 412. The weighted average has a bias towards server side receive buffer 474.

$$\text{maximum capacity } 492 = \frac{2*RTT\ 462}{RTT\ 412 + 2*RTT\ 462} * \text{capacity } 328 \qquad \text{Equation 1}$$

$$\text{maximum capacity } 442 = \frac{RTT\ 412}{RTT\ 412 + 2*RTT\ 462} * \text{capacity } 328 \qquad \text{Equation 2}$$

Equation 1 and equation 2 illustrate an embodiment wherein the sum of maximum capacity 492 and maximum capacity 442 equals capacity 328. In this embodiment, the factor of 2 for RTT 462 is selected such that service gateway 300 advertises ½ or half the maximum capacity 492 of server side receive buffer 474 for server side TCP session 470. It is appropriate to adjust the factor 2 with a different factor relating to the portion of server side receive buffer 474 advertised for server side TCP session 470.

In one embodiment, service gateway 300 obtains a new measurement of server side RTT 462 and/or a new measurement of client side RTT 412. Service gateway 300 applies equation 1 and equation 2 to modify maximum capacity 492 and maximum capacity 442.

In one embodiment, service gateway 300 further considers server side transmission rate 463 and client side transmission rate 413. Service gateway calculates using equation 3 and equation 4, using a weighted average of capacity 328 based on combination of transmission rate 463 and RTT 462, and transmission rate 413 and RTT 412. The weighted average has a bias towards server side receive buffer 474.

$$\text{maximum capacity } 492 = ((2*\text{transmission rate } 463*RTT\ 462)/(\text{transmission rate } 413*RTT\ 412 + 2*\text{transmission rate } 463*RTT\ 462))*\text{capacity } 328 \qquad \text{Equation 3}$$

$$\text{maximum capacity } 442 = ((\text{transmission rate } 413*RTT\ 412)/(\text{transmission rate } 413*RTT\ 412 + 2*\text{transmission rate } 463*RTT\ 462))*\text{capacity } 328 \qquad \text{Equation 4}$$

Equation 3 and equation 4 illustrate an embodiment wherein the sum of maximum capacity 492 and maximum capacity 442 equals capacity 328.

In one embodiment, service gateway 300 obtains a new server side transmission rate 463 and/or a new client side transmission rate 413. Service gateway 300 applies equations 3 and 4 to modify maximum capacity 492 and maximum capacity 442. In one embodiment, service gateway 300 obtains a new measurement of server side RTT 462 and/or a new measurement of client side RTT 412. Service gateway 300 applies equation 3 and equation 4 to modify maximum capacity 492 and maximum capacity 442.

Figure 5A:
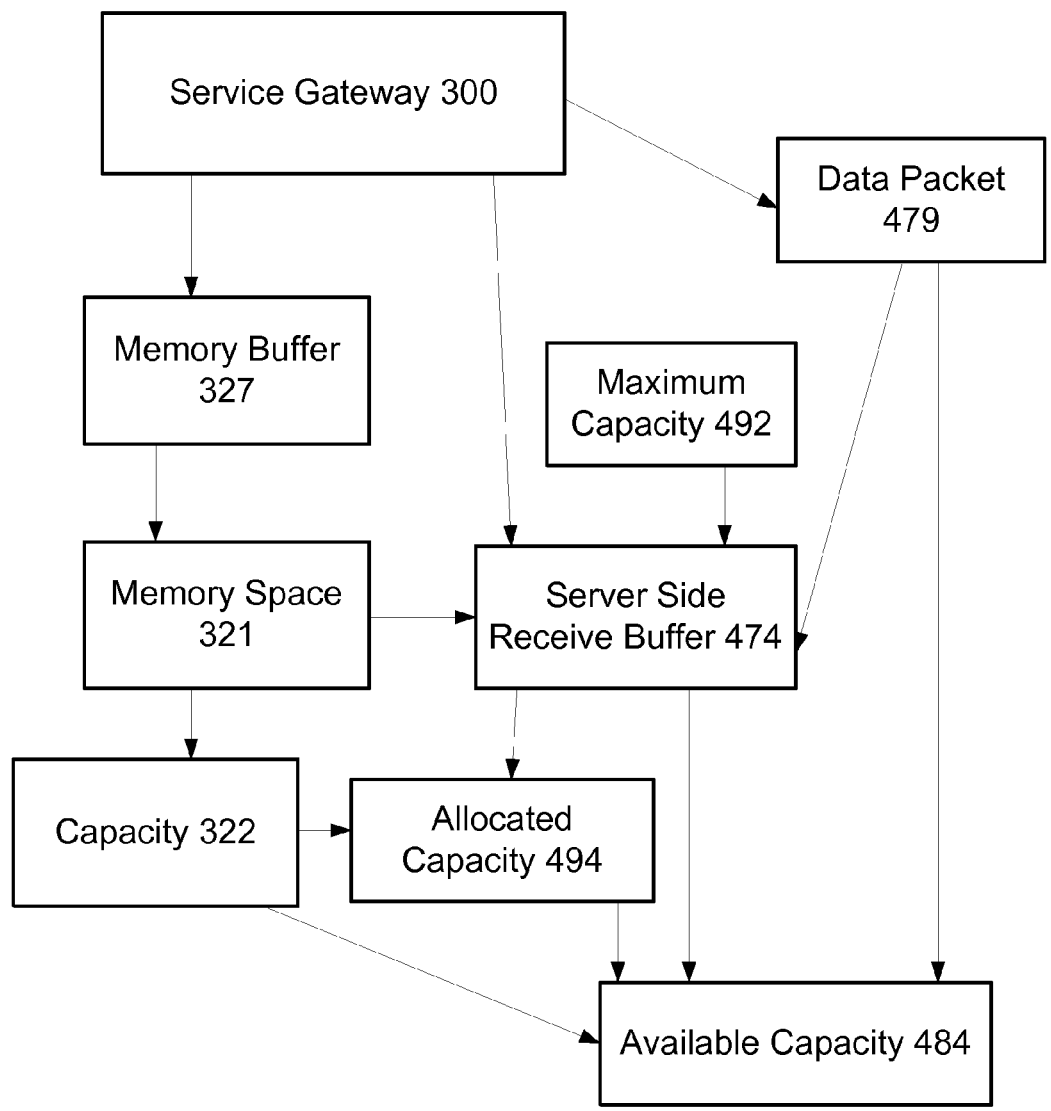
FIG. 5A illustrates an embodiment of a service gateway storing data packet into server side receive buffer according to the present invention.

In FIG. 5A, further illustrating an embodiment in FIG. 2A where service gateway 300 stores server side data packet 479 into server side receive buffer 474 and finds that available capacity 484 of server side receive buffer 474 is insufficient. Service gateway 300 checks if allocated capacity 494 of server side receive buffer 474 is smaller than maximum capacity 492 of server side receive buffer 474. If allocated capacity 494 is at least that of maximum capacity 492 or the difference between allocated capacity 494 and maximum capacity 492 is smaller than the memory necessary to store data packet 479, service gateway 300 discards data packet 479.

In one embodiment, service gateway 300 determines there is sufficient memory space within maximum capacity 492 to store data packet 479. Service gateway 300 allocates a memory space 321 from memory buffer 327. In one embodiment, memory space 321 has a capacity 322. Service gateway 300 increases allocated capacity 494 of server side receive buffer 474 by an amount of capacity 322, and includes memory space 321 into server side receive buffer 474. Service gateway 300 allocates memory space 321 such that adjusted allocated capacity 494 does not exceed maximum capacity 492 of server side receive buffer 474. After storing data packet 479 into the updated server side receive buffer 474, service gateway 300 updates available capacity 484 of server side receive buffer 474 using capacity 322, and the space consumed by data packet 479.

Figure 5B:
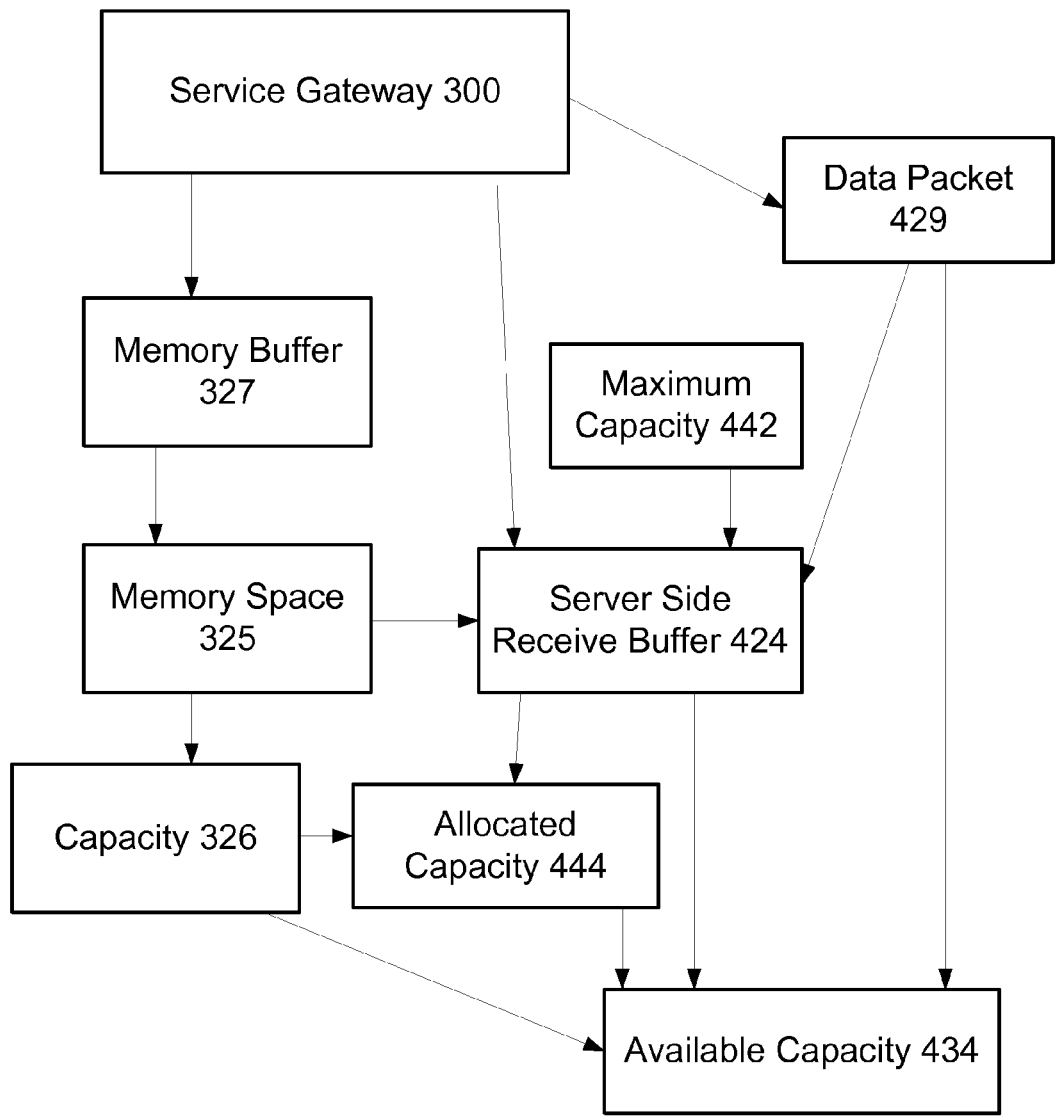
FIG. 5B illustrates an embodiment of a service gateway storing data packet into client side send buffer according to the present invention.

In FIG. 5B, further illustrating an embodiment in FIG. 2B where service gateway 300 stores data packet 429 into client side send buffer 424 and finds that available capacity 434 of client side send buffer 424 is insufficient. Service gateway 300 checks if allocated capacity 444 of client side send buffer 424 is smaller than maximum capacity 442 of client side send buffer 424. If allocated capacity 444 is at least that of maximum capacity 442 or the difference between allocated capacity 444 and maximum capacity 442 is smaller than the memory necessary to store data packet 429, service gateway 300 discards data packet 429.

In one embodiment, service gateway 300 determines there is sufficient memory space within maximum capacity 442 to store data packet 429. Service gateway 300 allocates a memory space 325 from memory buffer 327. In one embodiment, memory space 325 has a capacity 326. Service gateway 300 increases allocated capacity 444 of client side send buffer 424 by an amount of capacity 326, and includes memory space 325 into client side send buffer 424. Service gateway 300 allocates memory space 325 such that adjusted allocated capacity 444 does not exceed maximum capacity 442 of client side send buffer 424. After storing data packet 429 into the updated client side send buffer 424, service gateway 300 updates available capacity 434 using capacity 326, and the space consumed by data packet 429.

Figure 6:
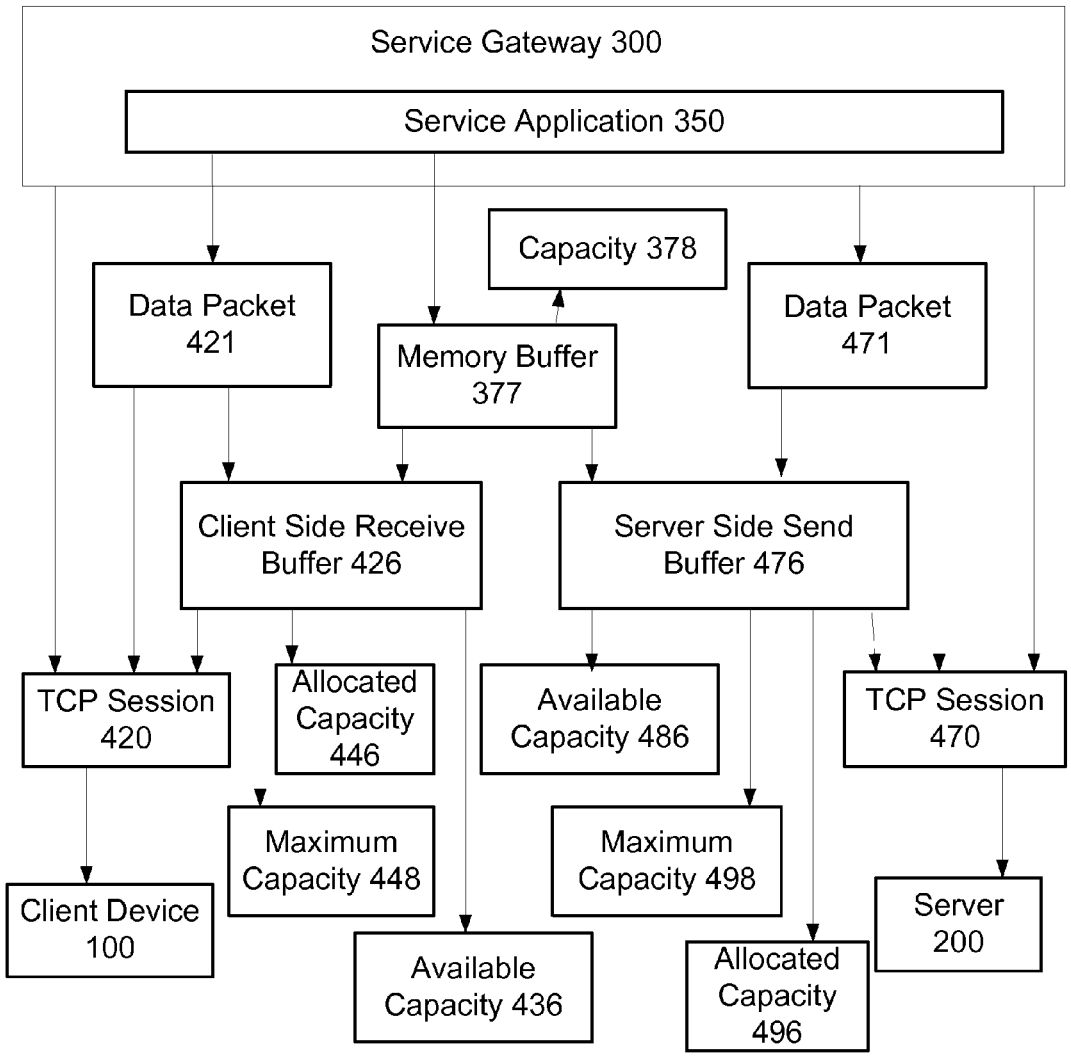
FIG. 6 illustrates an embodiment of a service gateway receiving a data packet from client device according to the present invention.

In one embodiment, client device 100 sends a data packet 421 to service gateway 300 via client side TCP session 420. As illustrated in FIG. 6, in one embodiment, service gateway 300 includes a memory buffer 377 which includes a client side receive buffer 426 and a server side send buffer 476. Memory buffer 377 is associated with a capacity 378. Client side receive buffer 426 is associated with an allocated capacity 446, an available capacity 436 and a maximum capacity 448. Server side send buffer 476 is associated with an allocated capacity 496, an available capacity 486 and a maximum capacity 498.

Service gateway 300 uses client side receive buffer 426 and server side send buffer 476 to handle data packet 421. Service gateway 300 receives data packet 421 and stores data packet 421 in client side receive buffer 426. Service application 350 retrieves data packet 421 from client side receive buffer 426, and generates a data packet 471 based on data packet 421. Service application 350 places data packet 471 in server side send buffer 476. Service gateway 300 transmits data packet 471 from server side send buffer 476 to server 200.

In one embodiment, service gateway 300 reserves a pre-determined capacity 378 of memory buffer 377 to handle TCP proxy session 400. In one embodiment, capacity 378 of memory buffer 377 is the same as capacity 328 of memory buffer 327. In one embodiment, capacity 378 is different from capacity 328.

Figure 7:
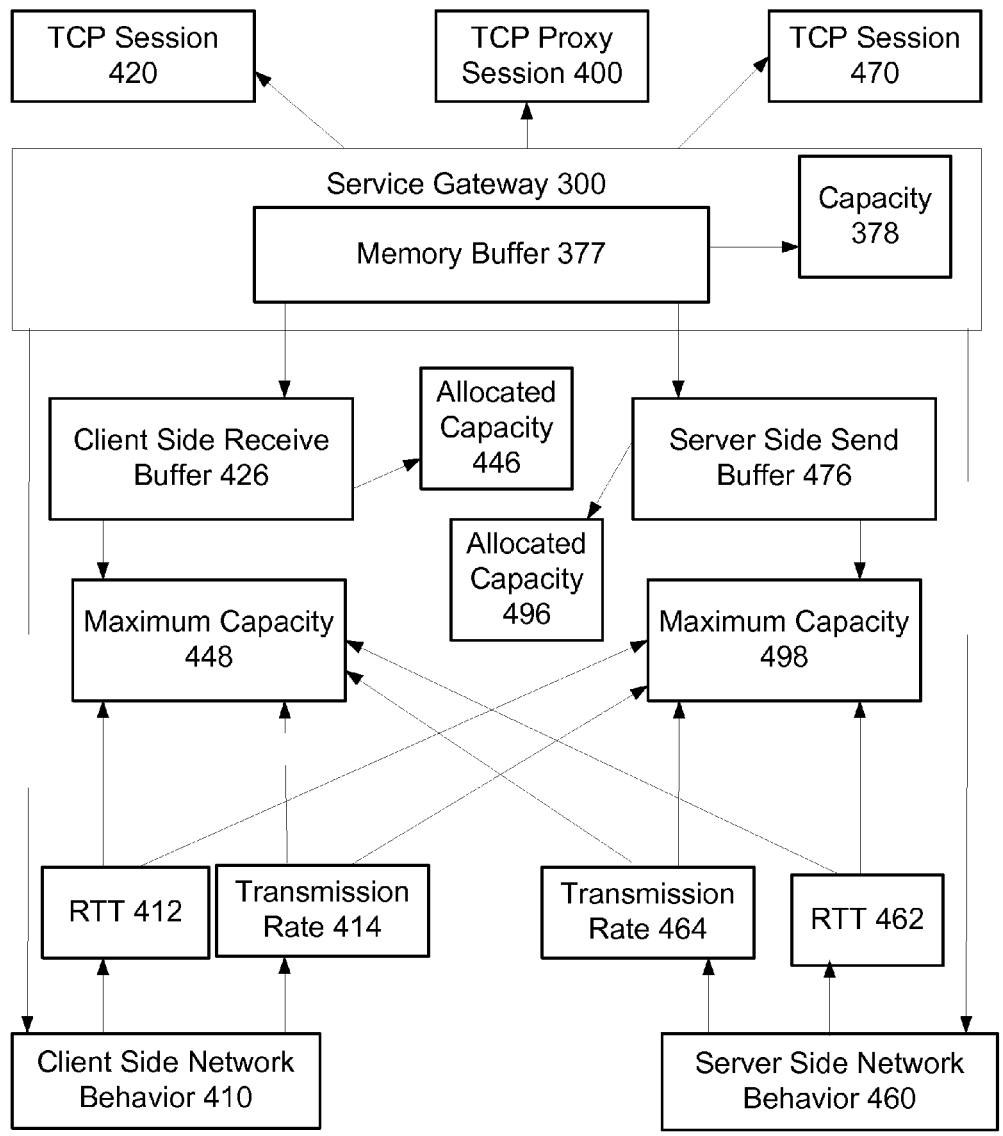
FIG. 7 illustrates an embodiment of a memory space allocation process for client side receive buffer and server side send buffer according to the present invention.

FIG. 7 illustrates an embodiment for service gateway 300 to allocate memory space from memory buffer 377 to server side send buffer 476 and client side receive buffer 426. In one embodiment, service gateway 300 reserves a portion of memory buffer 377 for server side send buffer 476 and a portion for client side receive buffer 426, when service gateway 300 starts processing TCP proxy session 400. In one embodiment, service gateway 300 starts processing TCP proxy session 400 when service gateway 300 establishes server side TCP session 470 and/or client side TCP session 420. In one embodiment, service gateway 300 allocates initially a pre-determined capacity 496 of server side send buffer 476. For example allocated capacity 496 is initially pre-determined at 10% of memory buffer 377, 8%, ⅛, or another fraction of memory buffer 377. In another embodiment, initial value of allocated capacity 496 is preset to be 30 KB, 32 KB, 4 KB, 64 KB or 100 KB. Similarly service gateway 300 pre-determines the initial allocated capacity 446 of client side receive buffer 426. Service gateway 300 further sets available capacity 486 of server side send buffer 476 to be the same as allocated capacity 496, and available capacity 436 of client side receive buffer 426 to be the same as allocated capacity 446.

In one embodiment, RTT 462 of network condition 460 affects sending of data packet 471. In one embodiment, network condition 460 includes a server side transmission rate 464. Service gateway 300 calculates server side transmission rate 464 as the bandwidth of a network interface used by network module 330 to transmit data packets of server side TCP session 470. In one embodiment, server side transmission rate 464 is the bandwidth of a virtual network interface. In one embodiment, service gateway 300 calculates server side transmission rate 464 by calculating one or more transmission rate of one or data packets of server side TCP session 470 over a period of time. In one embodiment, service gateway 300 calculates a new transmission rate 464 from time to time. In one embodiment, service gateway 300 calculates server side transmission rate 464 to be 1 Mbps, 43 Mbps, 100 Mbps, 1 Gbps, 600 Mbps, 25 Mbps or 10 Gbps.

In one embodiment, RTT 412 of network condition 410 also affects receiving of data packet 421. In one embodiment, network condition 410 includes a client side transmission rate 414. Service gateway 300 calculates client side transmission rate 414 as the bandwidth of a network interface used by network module 330 to receive data packets of client side TCP session 420. In one embodiment, client side transmission rate 414 is the bandwidth of a virtual network interface. In one embodiment, service gateway 300 calculates client side transmission rate 414 by calculating one or more transmission rate of one or data packets of client side TCP session 420 over a period of time. In one embodiment, service gateway 300 calculates a new transmission rate 414 from time to time. In one embodiment, service gateway 300 calculates client side transmission rate 414 to be 1 Mbps, 43 Mbps, 100 Mbps, 1 Gbps, 600 Mbps, 25 Mbps or 10 Gbps.

In one embodiment, service gateway 300 calculates maximum capacity 498 and maximum capacity 448, using network condition 460 and network condition 410, according to equation 5 and equation 6, using a weighted average of capacity 378 based on RTT 462 and RTT 412. The weighted average has a bias towards client side receive buffer 426.

$$\text{maximum capacity } 498 = \frac{RTT\ 462}{2*RTT\ 412 + RTT\ 462} * \text{capacity } 378 \qquad \text{Equation 5}$$

$$\text{maximum capacity } 448 = \frac{2*RTT\ 412}{2*RTT\ 412 + RTT\ 462} * \text{capacity } 378 \qquad \text{Equation 6}$$

Equation 5 and equation 6 illustrate an embodiment wherein the sum of maximum capacity 498 and maximum capacity 448 equals capacity 378. In this embodiment, the factor of 2 for RTT 412 is selected such that service gateway 300 advertises ½ or half the maximum capacity 448 of client side receive buffer 426 for client side TCP session 420. It is appropriate to adjust the factor 2 with a different factor relating to the portion of client side receive buffer 426 advertised for client side TCP session 420.

In one embodiment, service gateway 300 obtains a new measurement of server side RTT 462 and/or a new measurement of client side RTT 412. Service gateway 300 applies equation 5 and equation 6 to modify maximum capacity 498 and maximum capacity 448.

In one embodiment, service gateway 300 further considers server side transmission rate 464 and client side transmission rate 414. Service gateway calculates using equation 7 and equation 8, using a weighted average of capacity 378 based on combination of transmission rate 464 and RTT 462, and transmission rate 414 and RTT 412. The weighted average has a bias towards client side receive buffer 426.

$$\text{maximum capacity 498}=((\text{transmission rate 464*RTT 462})/(2*\text{transmission rate 414*RTT 412+transmission rate 464*RTT 462}))*\text{capacity 378} \quad \text{Equation 7}$$

$$\text{maximum capacity 448}=((2*\text{transmission rate 414*RTT 412})/(2*\text{transmission rate 414*RTT 412+transmission rate 464*RTT 462}))*\text{capacity 378} \quad \text{Equation 9}$$

Equation 7 and equation 8 illustrate an embodiment wherein the sum of maximum capacity 498 and maximum capacity 448 equals capacity 378.

In one embodiment, service gateway 300 obtains a new server side transmission rate 464 and/or a new client side transmission rate 414, service gateway 300 applies equation 7 and equation 8 to modify maximum capacity 498 and maximum capacity 448. In one embodiment, service gateway 300 obtains a new measurement of server side RTT 462 and/or a new measurement of client side RTT 412, service gateway 300 applies equation 7 and equation 8 to modify maximum capacity 492 and maximum capacity 442.

Figure 8A:
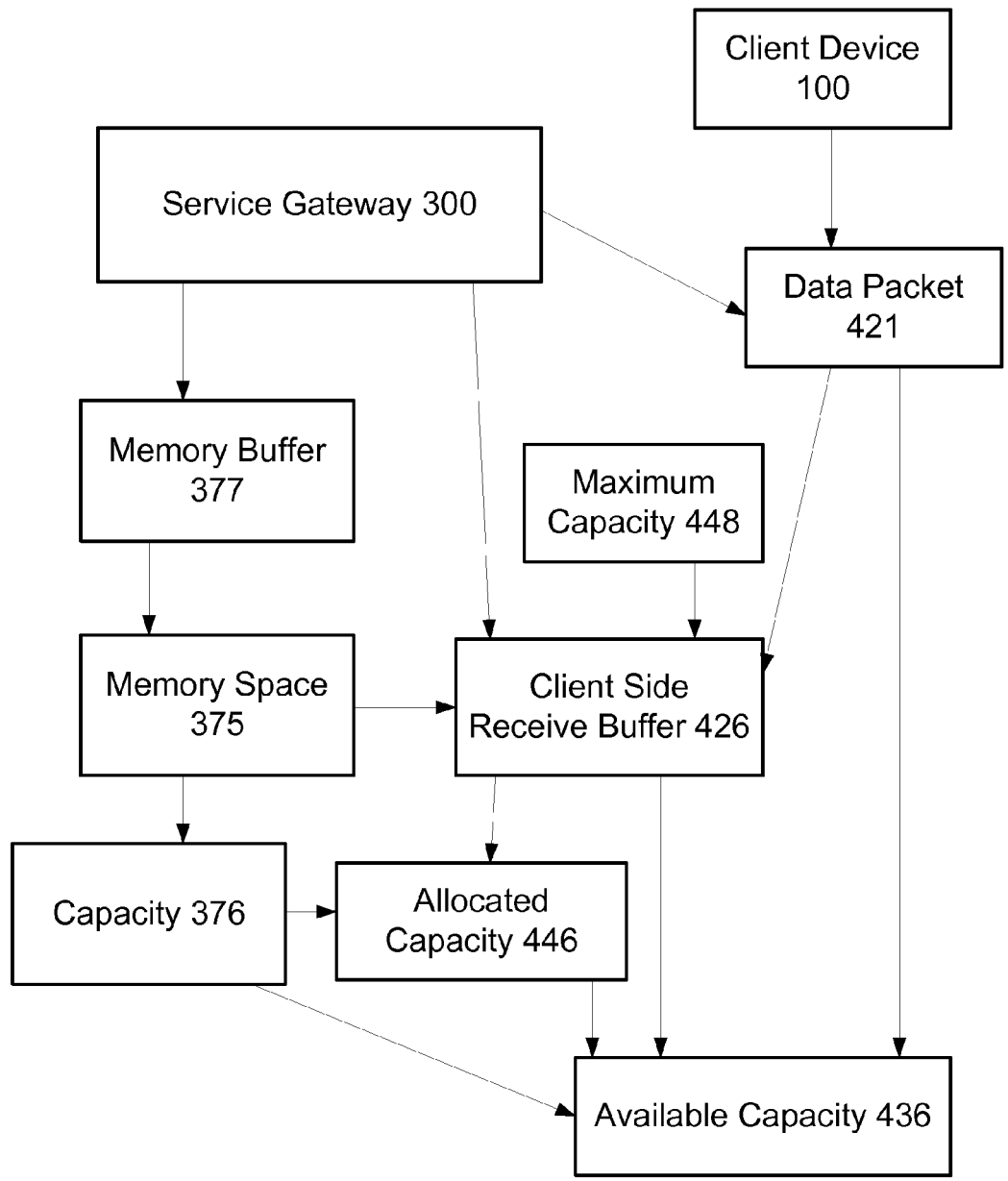
FIG. 8A illustrates an embodiment of a service gateway storing data packet into client side receive buffer according to the present invention.

In FIG. 8A, service gateway 300 receives data packet 421 from client device 100 and stores data packet 421 into client side receive buffer 426 and finds that available capacity 436 of client side receive buffer 426 is insufficient. Service gateway 300 checks if allocated capacity 446 of client side receive buffer 426 is smaller than maximum capacity 448 of client side receive buffer 426. If allocated capacity 446 is at least that of maximum capacity 448 or the difference between allocated capacity 446 and maximum capacity 448 is smaller than the memory necessary to store data packet 421, service gateway 300 discards data packet 421.

In one embodiment, service gateway 300 determines there is sufficient memory space within maximum capacity 448 to store data packet 421. Service gateway 300 allocates memory space 375 from memory buffer 377. In one embodiment, memory space 375 has a capacity 376. Service gateway 300 increases allocated capacity 446 by an amount of capacity 376, and includes memory space 375 into client side receive buffer 426. Service gateway 300 allocates memory space 375 such that adjusted allocated capacity 446 does not exceed maximum capacity 448 of client side send buffer 426. After storing data packet 421 into the updated client side receive buffer 426, service gateway 300 updates available capacity 436 of client side receive buffer 426 using capacity 376, and the space consumed by data packet 421.

Figure 8B:
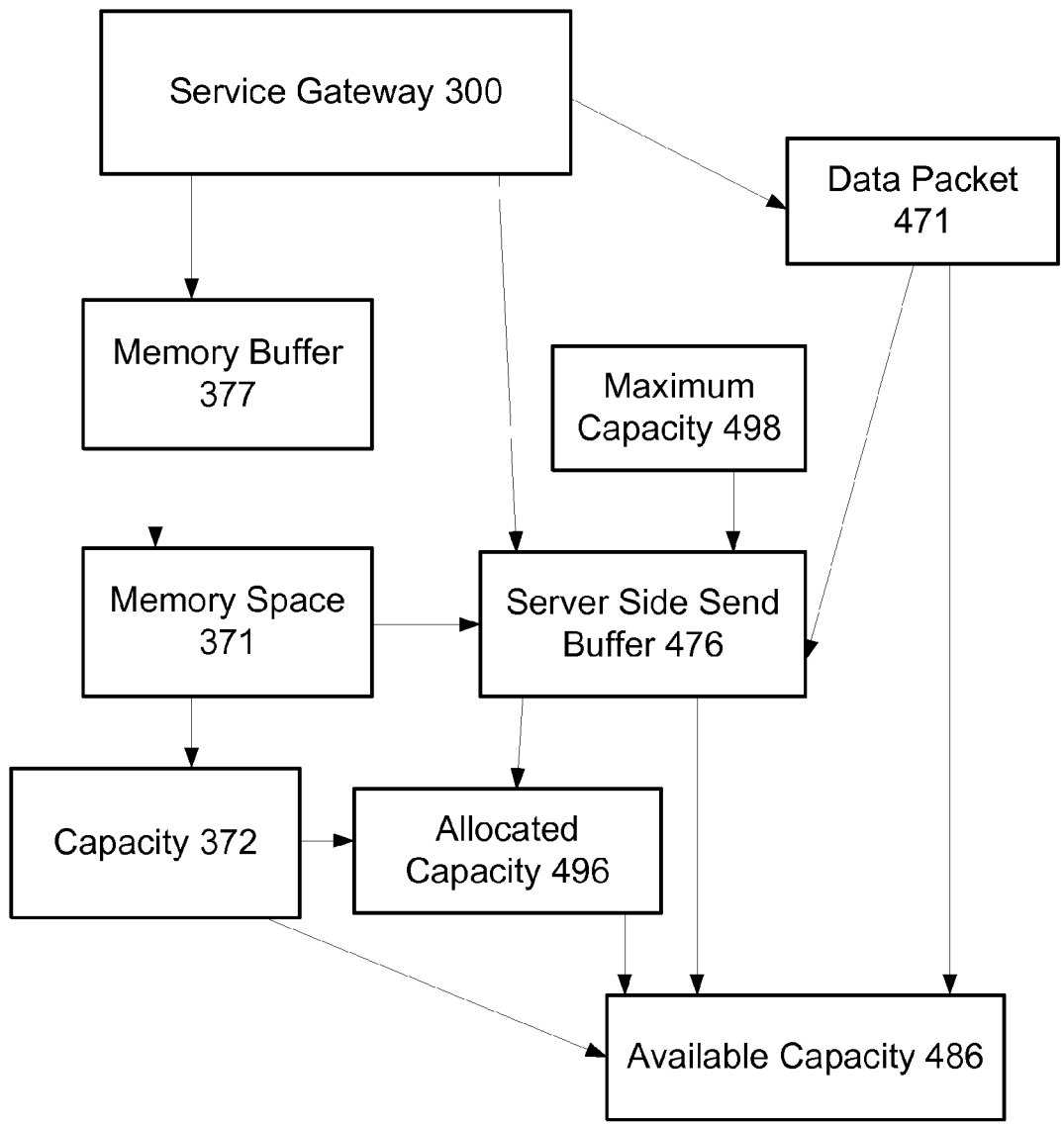
FIG. 8B illustrates an embodiment a service gateway storing data packet into server side send buffer according to the present invention.

In FIG. 8B, service gateway 300 stores data packet 471 into server side send buffer 476. In one embodiment, service gateway 300 finds that available capacity 486 of server side send buffer 476 is insufficient. Service gateway 300 checks if allocated capacity 496 of server side send buffer 476 is smaller than maximum capacity 498 of server side send buffer 476. If allocated capacity 496 is at least that of maximum capacity 498 or the difference between allocated capacity 496 and maximum capacity 498 is smaller than the memory necessary to store data packet 471, service gateway 300 discards data packet 471.

In one embodiment, service gateway 300 determines there is sufficient memory space within maximum capacity 498 to store data packet 471. Service gateway 300 allocates a memory space 371 from memory buffer 377. In one embodiment, memory space 371 has a capacity 372. Service gateway 300 increases allocated capacity 496 by an amount of capacity 372, and includes memory space 371 into server side send buffer 476. Service gateway 300 allocates memory space 371 such that adjusted allocated capacity 496 does not exceed maximum capacity 498. After storing data packet 471 into the updated server side send buffer 476, service gateway 300 updates available capacity 486 of server side send buffer 476 using capacity 372, and the space consumed by data packet 471.

In one embodiment, service application 350 retrieves data packet 471 from client side receive buffer 426. Service gateway 300 removes data packet 471 from client side receive buffer 426 and increase available capacity 436 according to the memory space consumed by data packet 471.

In one embodiment, network module 330 successfully transmits data packet 471 from server side send buffer 476. Service gateway 300 remove data packet 471 from server side send buffer 476 and increases available capacity 486 according to the memory space consumed by data packet 471.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allocating by a processor memory space in a memory buffer to a server side receive buffer and a client side send buffer, the method comprising:
    establishing at least one of a server side session and a client side session;
    processing a proxy session;
    allocating a first portion of the memory buffer to the server side receive buffer and a second portion of the memory buffer to the client side send buffer;
    determining at least one of a maximum capacity of the server side receive buffer and a maximum capacity of the client side send buffer; and
    re-allocating a third portion of the memory buffer to the server side receive buffer and a fourth portion of the memory buffer to the client side send buffer using the at least one of the maximum capacity of the server side receive buffer and the maximum capacity of the client side send buffer, wherein the maximum capacity of the server side receive buffer is substantially [(n*a server side data packet round trip time (RTT))/(a client side data packet RTT+n*the server side data packet RTT)]*a memory buffer capacity, and the maximum capacity of the client side send buffer is substantially [(the client side data packet RTT)/(the client side data packet RTT+2*the server side data packet RTT)]*the memory buffer capacity.

2. The method of claim 1 wherein each of the first portion and the second portion are pre-determined proportions of the memory buffer.

3. The method of claim 1 wherein the memory buffer has a capacity comprising a sum of the maximum capacity of the server side receive buffer and the maximum capacity of the client side send buffer.

4. The method of claim 3 further comprising calculating at least one of the maximum capacity of the server side receive buffer and the maximum capacity of the client side send buffer using the server side data packet RTT and the client side data packet RTT.

5. The method of claim 1 wherein n is selected such that 1/n is a fraction of the server side receive buffer advertised for the server side session.

6. The method of claim 1 wherein n is 2.

7. The method of claim 5 further comprising calculating at least one of the maximum capacity of the server side receive buffer and the maximum capacity of the client side send buffer further using a server side transmission rate and a client side transmission rate.

8. The method of claim 7 wherein the maximum capacity of the server side receive buffer is substantially [(n*the server side transmission rate*the server side data packet RTT)/(the client side transmission rate*the client side data packet RTT+n*the server side transmission rate*the server side data packet RTT)]*the memory buffer capacity, and the maximum capacity of the client side send buffer is substantially [(the client side transmission rate*the client side data packet RTT)/(the client side transmission rate*the client side data packet RTT+2*the server side transmission rate*the server side data packet RTT)]*the memory buffer capacity.

9. The method of claim 8 wherein n is selected such that 1/n is a fraction of the server side receive buffer advertised for the server side session.

10. The method of claim 9 wherein n is 2.

11. A system for allocating by a processor memory space in a memory buffer to a server side receive buffer and a client side send buffer, the system comprising:
    a processor; and
    a memory coupled to the processor, the processor storing a program executable by the processor to perform a method, the method comprising:
        establishing at least one of a server side session and a client side session;
        processing a proxy session;
        allocating a first portion of the memory buffer to the server side receive buffer and a second portion of the memory buffer to the client side send buffer;
        determining at least one of a maximum capacity of the server side receive buffer and a maximum capacity of the client side send buffer; and
        re-allocating a third portion of the memory buffer to the server side receive buffer and a fourth portion of the memory buffer to the client side send buffer using the at least one of the maximum capacity of the server side receive buffer and the maximum capacity of the client side send buffer, wherein the maximum capacity of the server side receive buffer is substantially [(n*a server side data packet round trip time (RTT))/(a client side data packet RTT+n*the server side data packet RTT)]*a memory buffer capacity, and the maximum capacity of the client side send buffer is substantially [(the client side data packet RTT)/(the client side data packet RTT+2*the server side data packet RTT)]*the memory buffer capacity.

12. The system of claim 11 wherein each of the first portion and the second portion are pre-determined proportions of the memory buffer.

13. The system of claim 11 wherein the memory buffer has a capacity comprising a sum of the maximum capacity of the server side receive buffer and the maximum capacity of the client side send buffer.

14. The system of claim 13 wherein the method further comprises calculating at least one of the maximum capacity of the server side receive buffer and the maximum capacity of the client side send buffer using a server side data packet RTT and client side data packet RTT.

15. The system of claim 11 wherein n is selected such that 1/n is a fraction of the server side receive buffer advertised for the server side session.

16. The system of claim 11 further comprising calculating at least one of the maximum capacity of the server side receive buffer and the maximum capacity of the client side send buffer further using a server side transmission rate and a client side transmission rate.

17. The system of claim 11 wherein the maximum capacity of the server side receive buffer is substantially [(n*a server side transmission rate*the server side data packet RTT)/(a client side transmission rate*the client side RTT+n*the server side transmission rate*the server side data packet RTT)]*the memory buffer capacity, and the maximum capacity of the client side send buffer is substantially [(the client side transmission rate*the client side data packet RTT)/(the client side transmission rate*the client side data packet RTT+2*the server side transmission rate*the server side data packet RTT)]*the memory buffer capacity.

18. The system of claim 17 wherein n is selected such that 1/n is a fraction of the server side receive buffer advertised for the server side session.

* * * * *